US010747692B2

(12) United States Patent
Mody et al.

(10) Patent No.: US 10,747,692 B2
(45) Date of Patent: Aug. 18, 2020

(54) IMAGE PROCESSING ACCELERATOR

(71) Applicant: TEXAS INSTRUMENTS INCORPORATED, Dallas, TX (US)

(72) Inventors: Mihir Mody, Bengaluru (IN); Niraj Nandan, Plano, TX (US); Hetul Sanghvi, Richardson, TX (US); Brian Chae, Duluth, GA (US); Rajasekhar Reddy Allu, Plano, TX (US); Jason A. T. Jones, Richmond, TX (US); Anthony Lell, San Antonio, TX (US); Anish Reghunath, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/234,508

(22) Filed: Dec. 27, 2018

(65) Prior Publication Data
US 2020/0210351 A1 Jul. 2, 2020

(51) Int. Cl.
*G06F 13/16* (2006.01)
*G06T 1/20* (2006.01)
*H04N 5/765* (2006.01)
*G06F 13/28* (2006.01)

(52) U.S. Cl.
CPC .......... *G06F 13/1668* (2013.01); *G06F 13/28* (2013.01); *G06T 1/20* (2013.01); *H04N 5/765* (2013.01)

(58) Field of Classification Search
CPC ....... G06F 13/1668; G06F 13/28; G06T 1/20; H04N 5/765
See application file for complete search history.

(56) References Cited

U.S. PATENT DOCUMENTS

| 7,643,535 | B1* | 1/2010 | Wiss | H04B 1/707 375/140 |
| 8,738,860 | B1* | 5/2014 | Griffin | G06F 12/0831 711/122 |
| 2002/0188885 | A1* | 12/2002 | Sihlbom | G06F 13/28 713/600 |
| 2007/0286275 | A1* | 12/2007 | Kimura | H04N 5/775 375/240.01 |
| 2011/0161620 | A1* | 6/2011 | Kaminski | G06F 12/1009 711/207 |

* cited by examiner

Primary Examiner — Henry Tsai
Assistant Examiner — John B Roche
(74) Attorney, Agent, or Firm — Brian D. Graham; Charles A. Brill; Frank D. Cimino

(57) ABSTRACT

A processing accelerator includes a shared memory, and a stream accelerator, a memory-to-memory accelerator, and a common DMA controller coupled to the shared memory. The stream accelerator is configured to process a real-time data stream, and to store stream accelerator output data generated by processing the real-time data stream in the shared memory. The memory-to-memory accelerator is configured to retrieve input data from the shared memory, to process the input data, and to store, in the shared memory, memory-to-memory accelerator output data generated by processing the input data. The common DMA controller is configured to retrieve stream accelerator output data from the shared memory and transfer the stream accelerator output data to memory external to the processing accelerator; and to retrieve the memory-to-memory accelerator output data from the shared memory and transfer the memory-to-memory accelerator output data to memory external to the processing accelerator.

23 Claims, 5 Drawing Sheets

IMAGE PROCESSING ACCELERATOR

BACKGROUND

Video processing is employed in a wide variety of applications to improve, or extract information from, acquired images. In a vehicular application, one or more cameras capture images of the environment in which the vehicle is operating, and video processing is applied to the acquired images to identify features (e.g., other vehicles, pedestrians, road boundaries, etc.) present in the vehicle's operating environment. A user of the vehicle may be alerted to the presence of an identified feature, or a vehicle control system may adjust the operation of the vehicle responsive to detection of a feature.

In video processing, accelerator circuitry is often employed to reduce the time and power needed to process a video stream. The accelerator circuitry may be implemented as a component of a system-on-chip that includes circuitry for processing the video stream in real-time and circuitry for non-real-time processing of image data.

SUMMARY

Accelerator circuitry for processing video images and other real-time data streams is disclosed herein. In one example, a processing accelerator includes a shared memory, a stream accelerator, a memory-to-memory accelerator, and a common direct memory access (DMA) controller. The stream accelerator is coupled to the shared memory and configured to process a real-time data stream, and to store stream accelerator output data generated by processing the real-time data stream in the shared memory. The memory-to-memory accelerator is coupled to the shared memory and configured to retrieve input data from the shared memory, to process the input data, and to store, in the shared memory, memory-to-memory accelerator output data generated by processing the input data. The common DMA controller is coupled to the shared memory and is configured to retrieve stream accelerator output data from the shared memory and transfer the stream accelerator output data to memory external to the processing accelerator; and to retrieve the memory-to-memory accelerator output data from the shared memory and transfer the memory-to-memory accelerator output data to memory external to the processing accelerator. The DMA controller may also retrieve data from memory external to the processing accelerator for processing by the stream accelerator or the memory-to-memory accelerator.

In another example, an image processing system includes a vision processing accelerator configured to process an image stream received from a camera. The vision processing accelerator includes a shared memory, a stream accelerator, a memory-to-memory accelerator, a common DMA controller, and a scheduler. The shared memory includes a plurality of banks. The stream accelerator is coupled to the shared memory and is configured to process, in real-time, the image stream received from the camera, and to access a first variable depth circular buffer formed in the shared memory to store processed image data generated by the stream accelerator. The memory-to-memory accelerator is coupled to the shared memory and is configured to process blocks of the processed image data generated by the stream accelerator, to access the first variable depth circular buffer to retrieve the processed image data, and to access a second variable depth circular buffer formed in the shared memory to store blocks of image data generated by the memory-to-memory accelerator. The common DMA controller is coupled to the shared memory and is configured to transfer image data generated by the stream accelerator to a memory external to the vision processing accelerator, and to transfer image data generated by the memory-to-memory accelerator to memory external to the vision processing accelerator. The scheduler is coupled to the stream accelerator, the memory-to-memory accelerator, and the DMA controller. The scheduler is configured to synchronize retrieval of the processed image data generated by the stream accelerator from the first variable depth circular buffer by the memory-to-memory accelerator based on availability of the processed image data in the first circular buffer. The scheduler is also configured to automatically initiate processing of a next frame by the stream accelerator on completion of processing of a current frame by the stream accelerator.

In a further example, an image processing accelerator includes a shared memory, a plurality of hardware accelerators, a common direct memory access (DMA) controller, and a scheduler. Each of the hardware accelerators is coupled to the shared memory, and is configured to transfer image data via circular buffers formed in the shared memory, to process the image data to produce processed image data, and to store the processed image data in one of the circular buffers. The common DMA controller is coupled to the shared memory, and is configured to transfer data between memory external to the image processing accelerator and one or more of the circular buffers. The scheduler is coupled to the common DMA controller and each of the hardware accelerators. The scheduler is configured to monitor transfer of data to the circular buffers by the hardware accelerators and the common DMA controller, and to synchronize retrieval of data from the circular buffers by the hardware accelerators and the common DMA controller based on availability of data in the circular buffers.

BRIEF DESCRIPTION OF THE DRAWINGS

For a detailed description of various examples, reference will now be made to the accompanying drawings in which.

DETAILED DESCRIPTION

Figure 1:
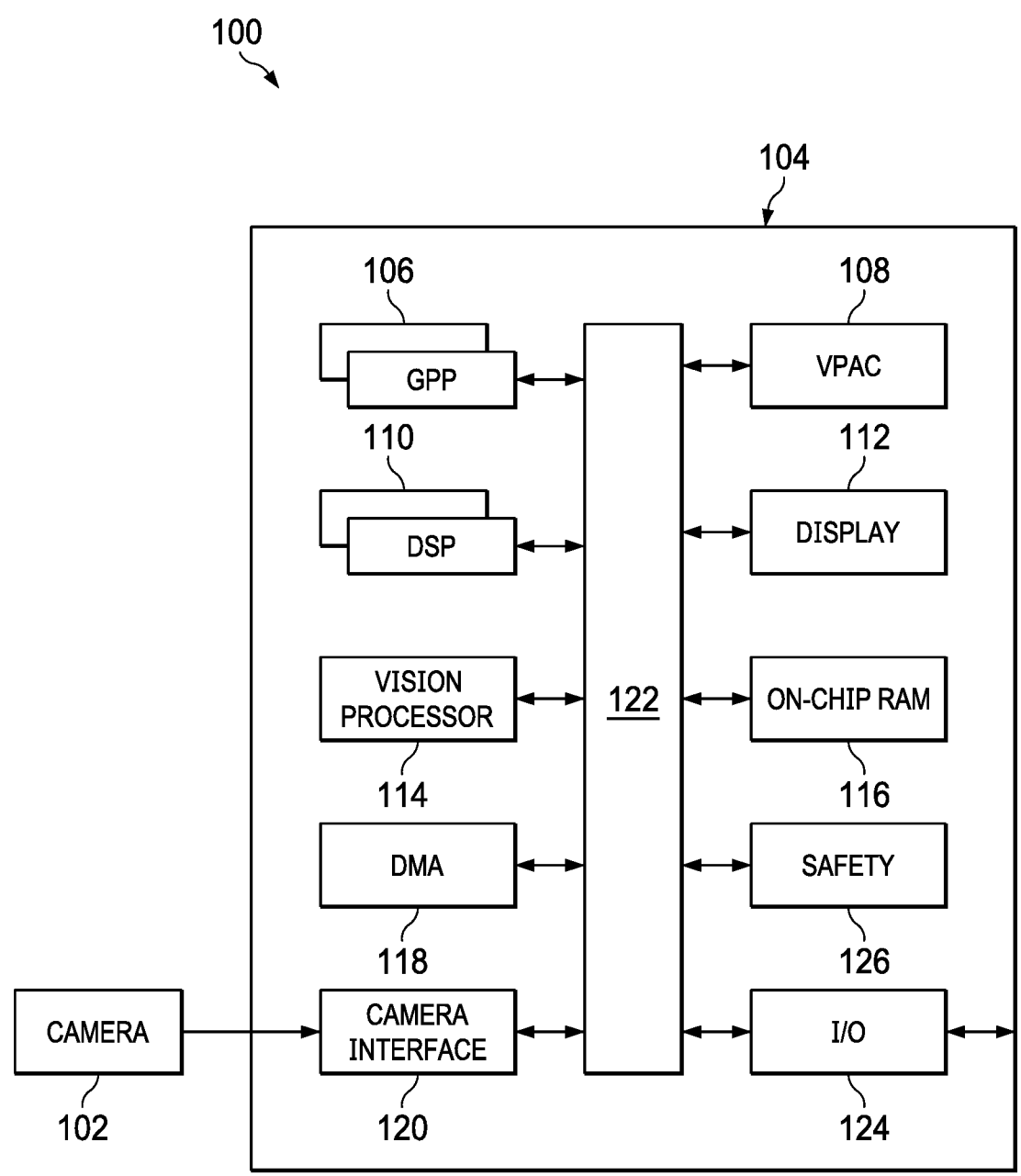
FIG. 1 shows a block diagram for an example of an image processing system that includes a processing accelerator in accordance with the present disclosure.

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an openended fashion, and thus should be interpreted to mean "including, but not limited to. . . ." Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

Video processing accelerators implemented as or part of a system-on-chip (SoC) include a real-time processing subsystem to receive a video stream and process the video stream in real-time, and a non-real-time processing subsystem to provide processing operations that need not be performed in real-time. The two subsystems may be provided as discrete systems with data transfer between the subsystems implemented through memory external to the SoC. For example, the real-time processing subsystem may include multiple hardware accelerators arranged in series with video data transfer between the accelerators provided via storage arranged as ping-pong buffers (e.g., a pair of memories arranged for reading from one memory while the other memory is being written). In some implementations, the real-time processing subsystem may include multiple hardware accelerators arranged in series with video data transfer between the accelerators done at pixel level and both sender (producer) and receiver (consumer) are ready to move forward with pipeline in sync. The real-time processing subsystem may include an output first-in-first-out (FIFO) memory to buffer output of the chain of accelerators for transfer to external memory by a dedicated direct memory access (DMA) controller. The non-real-time processing subsystem may include data processing circuitry to manipulate image data retrieved from the external memory and a dedicated DMA controller to transfer data blocks to and from the external memory. Thus, the real-time processing subsystem and the non-real-time processing subsystem may be distinct processing systems that communicate through a memory external to the SoC.

The video accelerator architecture described above, while providing for some acceleration of video processing, is also subject to a number of disadvantages. For example, sizes of the ping-pong buffers and output FIFO of the real-time processing subsystem are fixed, and consequently limit the operational flexibility of the accelerator. If the storage size of the output FIFO is insufficient to absorb latency in accessing the external memory, then output data of the real-time video stream will be lost. The hardware accelerators and the ping-pong memories disposed therebetween limit the size of data transfers into and out of the hardware accelerators, and as a result, the performance of the hardware accelerators may be degraded because the accelerators are unable to decompose the video stream into units that promote processing efficiency. Additionally, the separate dedicated DMA controllers through which the real-time processing subsystem and the non-real-time processing subsystem communicate with external memory increase the circuit area of the SoC.

The video acceleration circuitry disclosed herein provides improved flexibility and performance by providing communication between streaming accelerators and memory-to-memory processing accelerators via a shared memory that is included on the SoC. Data transfers to the external memory are provided via a single common DMA controller to reduce DMA controller circuit area. The accelerators include load/store engines that access the shared memory. The load/store engines hide access latency and access the shared memory as variable depth circular buffers. Providing for changes in the depth of the circular buffers allows the video acceleration circuitry to accommodate changes in external memory latency and avoid loss of real-time video data. The load/store engines also allow for data retrieved from the shared memory to be presented to the hardware accelerator with a unit size that is most efficient for processing by the hardware accelerator.

FIG. 1 shows a block diagram for an example of an image processing system 100 in accordance with the present disclosure. The image processing system 100 includes a camera 102 and an SoC 104 coupled to the camera 102. Some implementations of the image processing system 100 may include more than one camera 102 coupled to the SoC 104. The camera 102 may be a video camera configured to capture images at a specified rate and resolution (e.g., 30 red/green/blue encoded images per second at a resolution of 1920x1080 pixels).

The SoC 104 includes a general purpose processor (GPP) 106, a digital signal processor (DSP) 110, a vision processor 114, and a vision preprocessing accelerator (VPAC) 108 (also referred to herein as a "processing accelerator") coupled via a high speed interconnect 122. The VPAC 108 includes several hardware accelerators configured to perform various processing operations on incoming images received from the camera 102. The vision processor 114 is a vector processor tuned for computer vision processing such as gradient computation, orientation binning, histogram normalization, etc. Such computer vision processing may use the preprocessed output of the VPAC 108. Some implementations of the vision processor 114 include a hardware accelerator to facilitate computer vision processing by providing processing, such as depth computation, for incoming image or vision data. The GPP 106 hosts the operating system and provides overall control of the operation of the SoC 104 including scheduling of the preprocessing tasks performed by the VPAC 108. The DSP 110 provides support for computer vision processing such as object detection and classification.

The SoC 104 further includes a DMA controller 118, a camera interface 120, a display management component 112, on-chip random access memory (RAM) 116, e.g., a computer readable medium, and various input/output (I/O) peripherals 124 all coupled to the processors 106, 110, and 114, and the VPAC 108 via the high speed interconnect 122. In addition, some implementations of the SoC 104 that are directed to automotive applications include a safety component 126 that includes safety related functionality to enable compliance with automotive safety requirements. Such functionality may include support for CRC (cyclic redundancy check) of data, clock comparator for drift detection, error signaling, windowed watch-dog timer, and self-testing of the SoC 104 for damage and failures.

Figure 2:
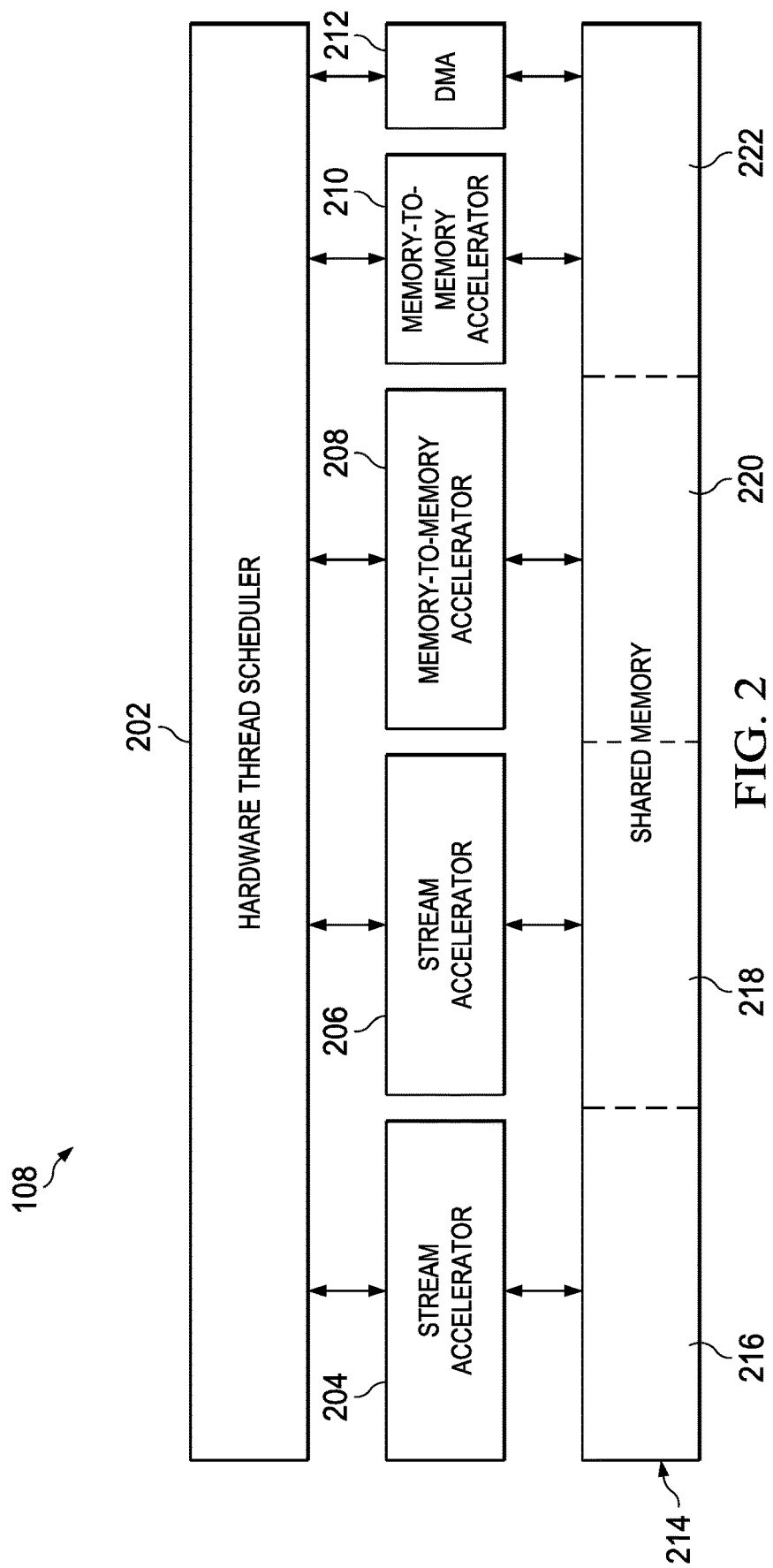
FIG. 2 shows a block diagram for an example of a vision preprocessing accelerator in accordance with the present disclosure.

FIG. 2 shows a block diagram for an example of the VPAC 108 in accordance with the present disclosure. The VPAC 108 includes a hardware thread scheduler 202, a stream accelerator 204, a stream accelerator 206, a memory-to-memory accelerator 208, a memory-to-memory accelerator 210, a DMA controller 212, and a shared memory 214. The hardware thread scheduler 202 and the shared memory 214 are coupled to each of the stream accelerator 204, the stream accelerator 206, the memory-to-memory accelerator 208, the memory-to-memory accelerator 210, and the DMA controller 212. Various implementations of the VPAC 108 may include one or more stream accelerators and one or more memory-to-memory accelerators, each of which is coupled to the hardware thread scheduler 202 and the shared memory 214. The stream accelerator 204, the stream accelerator 206, the memory-to-memory accelerator 208, and the memory-to-memory accelerator 210 may be generically referred to herein as "hardware accelerators."

The hardware thread scheduler 202 includes circuitry that is configurable (e.g., via software executed by the GPP 106) to schedule the execution of a single thread of tasks or multiple concurrent threads of tasks in the VPAC 108. A thread, which may also be referred to as a pipeline, is one or more tasks. A task is a particular function that may be, for example, performed by the stream accelerator 204, the stream accelerator 206, the memory-to-memory accelerator 208, the memory-to-memory accelerator 210, the DMA controller 212, or software implementing a task on a processor external to the VPAC 108, e.g., the DSP 110. The hardware thread scheduler 202 includes a plurality of task scheduler circuits and a crossbar circuit that is coupled to each of the task scheduler circuits and provides for communication between the task scheduler circuits. One or more of the task scheduler circuits is coupled to each of the stream accelerator 204, the stream accelerator 206, the memory-to-memory accelerator 208, the memory-to-memory accelerator 210, and the DMA controller 212 for coordination of processing between the stream accelerator 204, the stream accelerator 206, the memory-to-memory accelerator 208, the memory-to-memory accelerator 210, and the DMA controller 212.

The hardware thread scheduler 202 may be configured (e.g., programmed prior to commencement of video stream processing) to automatically initiate frame processing and thereby reduce the need for software interaction with the VPAC 108 during processing of an image stream. As each frame of an image stream is processed by the VPAC 108, the hardware thread scheduler 202 may automatically initiate processing of a next frame by the VPAC 108 without intervention by an external processor (e.g., the GPP 106). Accordingly, real-time processing in the VPAC 108 is not subject to the timing delays and uncertainties associated with initiating frame processing via software.

The stream accelerator 204 and the stream accelerator 206 include circuitry for processing image data in real-time as it is received from the camera 102. For example, the stream accelerator 204 and the stream accelerator 206 may include circuitry to receive image data received directly from the camera 102 and process each line of an image as the line is received. Examples of processing functions provided by the stream accelerator 204 and/or the stream accelerator 206 include noise filtering, de-mosaicing, color enhancement, wide dynamic range processing, etc.

The memory-to-memory accelerator 208 and the memory-to-memory accelerator 210 include circuitry for non-real-time processing of image data. For example, implementations of the memory-to-memory accelerator 208 and the memory-to-memory accelerator 208 include circuitry that processes data in blocks that may include data from multiple lines of an image or data in lines. Thus, in order of the memory-to-memory accelerator 208 to process image data, multiple lines of image data must have been received and processed by a stream accelerator 204, 206 and made available for further processing by the memory-to-memory accelerator 208, 210. Examples of processing provided by the memory-to-memory accelerator 208 and/or the memory-to-memory accelerator 210 include noise filtering, lens distortion correction, and image scaling. Some implementations of the stream accelerators 204 and 206 also include circuitry that enables the stream accelerators 204 and 206 to provide non-real-time processing. That is, some implementations of the stream accelerators 204 and 206 may provide the functionality of memory-to-memory accelerators as described herein in addition to operating as stream accelerators.

The DMA controller 212 couples the shared memory 214 to the high speed interconnect 122, and is common to (i.e., shared by) the stream accelerators and the memory-to-memory accelerators. The DMA controller 212 moves processed image data generated by the stream accelerators and/or the memory-to-memory accelerators from the shared memory 214 to destinations external to the VPAC 108 via the high speed interconnect 122, and moves data to be processed by the stream accelerators and/or the memory-to-memory accelerators from destinations external to the VPAC 108 to the shared memory 214. For example, the DMA controller 212 may transfer processed image data from the shared memory 214 to the on-chip RAM 116, or other memory external to the VPAC 108, via the high speed interconnect 122, and/or may transfer data to be processed from the on-chip RAM 116, or other memory external to the VPAC 108, to the shared memory 214. The DMA controller 212 includes multiple channels, where each channel may be used to a transfer data between memory external to the VPAC 108 and a different one of the hardware accelerators of the VPAC 108. Activation of a DMA channel to transfer data between the shared memory 214 and an external memory may be triggered by the hardware thread scheduler 202, which monitors the activity of the hardware accelerators and the DMA controller 212. Some implementations of the DMA controller 212 may include a first DMA engine that is dedicated to transfer of real-time data streams (e.g., lines of video received from the camera 102) from the VPAC 108 to memory external to the VPAC 108, and a second DMA engine that handles non-real-time data transfers. The DMA engine that is dedicated to real-time data transfers may include ports and other resources that facilitate transfer of real-time data without stalling.

The stream accelerator 204, the stream accelerator 206, the memory-to-memory accelerator 208, the memory-to-memory accelerator 210, and the DMA controller 212 are coupled to the shared memory 214. All communication of image data that has been processed in the VPAC 108 is through the shared memory 214. The shared memory 214 includes a plurality of banks. For example, in FIG. 2, the shared memory 214 includes bank 216, bank 218, bank 220, and bank 222. Some implementations of the shared memory 214 may include more or fewer banks. Each of the banks is an independent memory region that can be accessed (read or written) without affecting the access timing of any other bank. That is, all of the banks 216-222 of the shared memory 214 can be accessed simultaneously and without delays or conflicts.

Figure 3A:
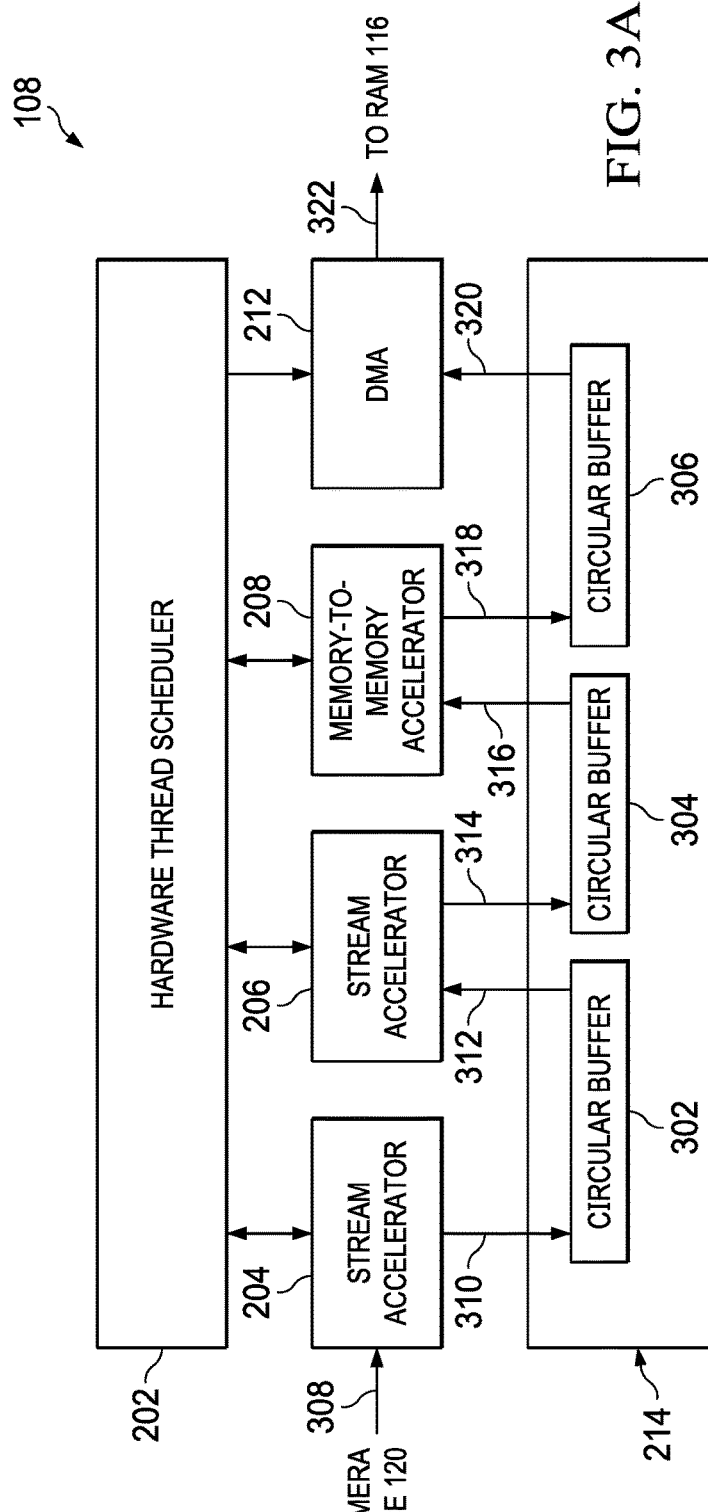
FIGS. 3A and 3B show examples of configurations of a vision preprocessing accelerator in accordance with the present disclosure.

FIG. 3A shows the VPAC 108 in an example image processing configuration. In FIG. 3A, the GPP 106 or other processor with access to the VPAC 108 has configured the VPAC 108 to process the video stream 308 received from the camera 102. In the configuration of FIG. 3A, the stream accelerator 204, the stream accelerator 206, and the memory-to-memory accelerator 208 are configured to process the received video data, and the DMA controller 212 is configured to transfer the results 322 of processing to the on-chip RAM 116 or other memory (e.g., memory external to the SoC 104) via the high speed interconnect 122. The hardware thread scheduler 202 is configured to coordinate operation of the stream accelerator 204, the stream accelerator 206, the memory-to-memory accelerator 208, and the DMA controller 212.

In the configuration of FIG. 3A, the stream accelerator 204 receives and processes the video stream 308 (e.g., processes one line of video at a time), and transfers the results 310 of processing to the shared memory 214. More specifically, the stream accelerator 204 writes the results 310 of processing to a circular buffer 302 formed in the shared memory 214. The circular buffer 302 may be implemented using one or more of the banks 216-222 of the shared memory 214. The depth (i.e., the number of units of storage) of the circular buffer 302, and all circular buffers formed in the shared memory 214, is variable via software configuration to accommodate the size and format of data transferred and transfer latency between hardware accelerators. For example, configuration information provided to the stream accelerator 204 and the stream accelerator 206 by the GPP 106 may set the depth of the circular buffer 302. The stream accelerator 206 retrieves the processed image data 312 from the circular buffer 302 for further processing.

The unit of storage applied in a circular buffer may vary with the data source. The stream accelerator 204 processes the video stream 308 received from the camera 102. As each line of video data is received, the stream accelerator 204 processes the line, and transfers the processed line of video data to the circular buffer 302. Thus, the unit of storage of the circular buffer is a line with respect to the stream accelerator 204. Other sources may write to a circular buffer using a different unit of data. For example, the memory-to-memory accelerator 208 may process data in units of two-dimensional blocks and write to a circular buffer in units of two-dimensional blocks.

The stream accelerator 206 processes the image data 312 retrieved from the circular buffer 302, and transfers the results 314 of processing to the shared memory 214. More specifically, the stream accelerator 206 writes the results 314 of processing to a circular buffer 304 formed in the shared memory 214. The memory-to-memory accelerator 208 retrieves the processed image data 316 from the circular buffer 304 for further processing. The circular buffer 304 may be implemented using one or more of the banks 216-222 of the shared memory 214. The depth of the circular buffer 304 is software configurable to accommodate the size and format of data transferred and transfer latency between hardware accelerators. For example, configuration information provided to the stream accelerator 204 and the memory-to-memory accelerator 208 by the GPP 106 may set the depth of the circular buffer 304. Because the memory-to-memory accelerator 208 may process image data in blocks that include data from multiple lines of an image, the circular buffer 304 may be sized to store multiple lines of image data. The depth of the circular buffer 304 may also be a function of the processing performed by the memory-to-memory accelerator 208.

The memory-to-memory accelerator 208 processes the image data 316 retrieved from the circular buffer 304, and transfers the results 318 of processing to the shared memory 214. More specifically, the memory-to-memory accelerator 208 writes the results 318 of processing to a circular buffer 306 formed in the shared memory 214. The DMA controller 212 retrieves the processed image data 320 from the circular buffer 306 for further processing. The depth of the circular buffer 306 is software configurable to accommodate the size and format of data transferred and the access latency to (time delay in accessing) memory external to the VPAC 108. Thus, the depth of the circular buffer 306 may be varied as needed to buffer the video data for transfer to memory external to the VPAC 108. Because memory external to the VPAC 108 may be accessed by any number of devices, the delay in writing to the memory external to the VPAC 108 is compensated for by the depth of the circular buffer 306. For example, if the vision processor 114 and/or the DSP 110 are executing processing that accesses the on-chip RAM 116 frequently, then the circular buffer 306 may be made longer to compensate for reduced access to the on-chip RAM 116. Conversely, if the vision processor 114 and the DSP 110 are executing processing that accesses the on-chip RAM 116 infrequently, then the circular buffer 306 may be made shorter because time to access the on-chip RAM 116 is reduced. Thus, the depth of the circular buffer 306 may be a function of the access loading of a write destination of the DMA controller 212. Configuration information provided to the memory-to-memory accelerator 208 and the DMA controller 212 by the GPP 106 may set the depth of the circular buffer 304 accordingly. Similarly, configuration information provided to the DMA controller 212 by the GPP 106 may set transfer destination, length, and other parameters of the DMA controller 212.

Because the DMA controller 212 includes multiple channels, the DMA controller 212 may execute multiple simultaneous transfers between the shared memory 214 and memory external to the VPAC 108. For example, referring again to FIG. 3A, a first channel of the DMA controller 212 may be configured to transfer the data stored in the circular buffer 306 to external memory, and a second channel of the DMA controller 212 may configured to transfer the real-time streaming data stored in a different circular buffer (e.g., the circular buffer 302 the stores the output of the stream accelerator 206) memory external to the VPAC 108. Similarly, a third and fourth channel of the DMA controller 212 may be configured to retrieve data from external memory for storage in a circular buffer and processing by the memory-to-memory accelerator 210 and transfer data generated by the memory-to-memory accelerator 210 to external memory.

The VPAC 108 may process an image stream or other data in line mode or frame mode. In line mode, a single line (e.g., a predetermined quantity) of image data (or other data) is loaded (e.g., read from the shared memory 214 or received from the camera interface 120) into a stream accelerator (e.g., the stream accelerator 204), processing of the line is executed, and the processed line data is transferred to the shared memory 214. Thereafter, a new line is loaded in the stream accelerator and processed. Thus, in line mode, the processing of each line is separate and distinct. Input and processing of each line may be controlled by the hardware thread scheduler 202. In frame mode, input of line data is decoupled from output of processed line data. Line data may be input continuously during line data processing to provide improved efficiency of image stream processing.

Figure 3B:
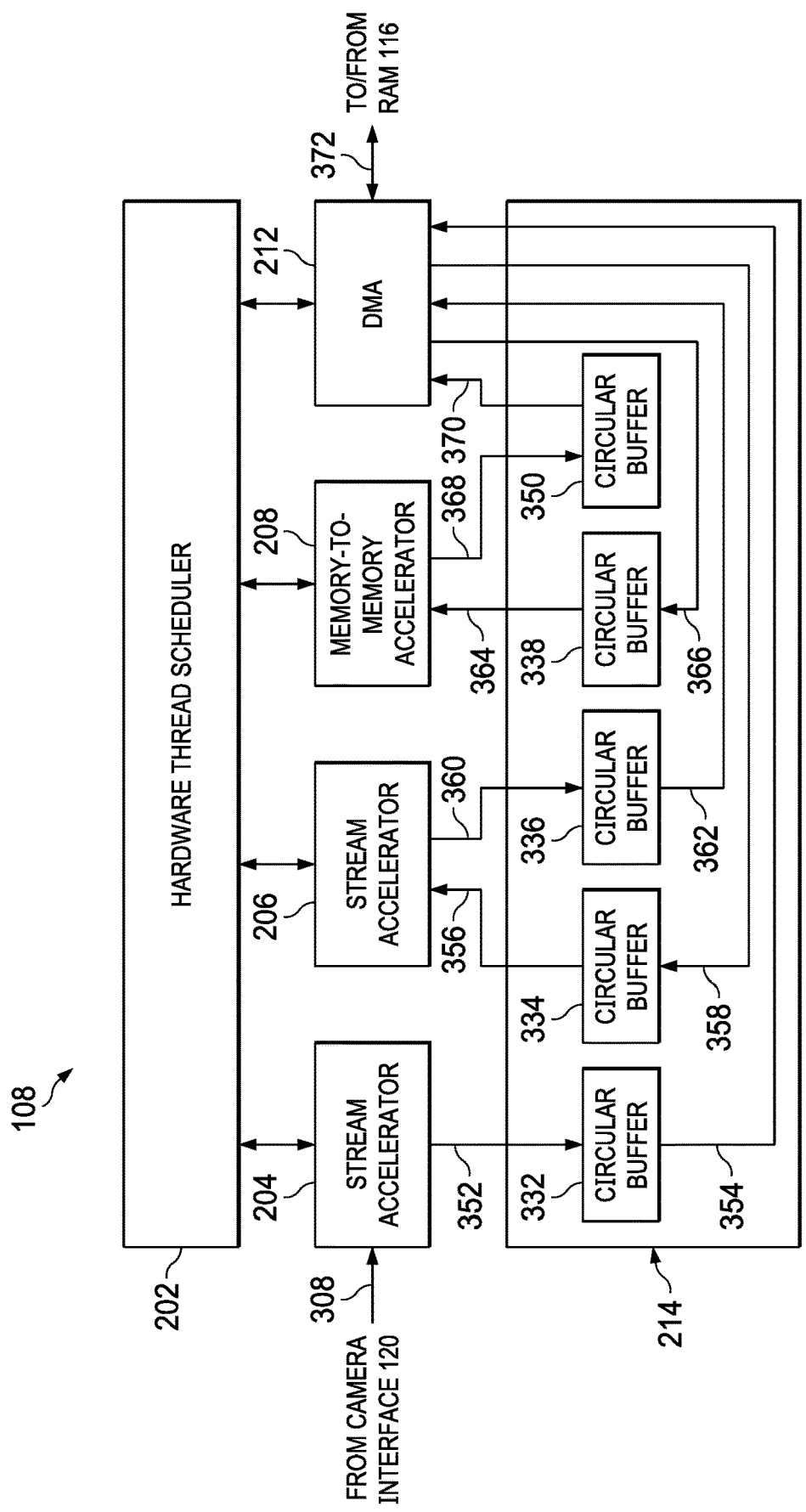

While the configuration of FIG. 3A shows the VPAC 108 configured to transfer data between the hardware accelerators via the shared memory 214, thereby reducing the number of transfers to and from external memory, the VPAC 108 provides a wide variety of processing configurations. In FIG. 3B, the GPP 106 or other processor with access to the VPAC 108 has configured the VPAC 108 to apply each of the hardware accelerators independently. In the configuration of FIG. 3B, the stream accelerator 204 is configured to process a received real-time video stream (i.e., video not passing through the shared memory 214), while the stream accelerator 206, and the memory-to-memory accelerator 208 are configured to process the data retrieved from memory external to the VPAC 108. The DMA controller 212 is configured to retrieve data for processing by the stream accelerator 206, and the memory-to-memory accelerator 208 from external memory, and to transfer results of processing from the shared memory 214 to memory external to the VPAC 108. The hardware thread scheduler 202 is configured to coordinate and synchronize operation of the stream accelerator 204, the stream accelerator 206, the memory-to-memory accelerator 208, and the DMA controller 212.

In the configuration of FIG. 3B, the stream accelerator 204 receives and processes the video stream 308 (e.g., processes one line of video at a time), and transfers the results 352 of processing to the shared memory 214. More specifically, the stream accelerator 204 writes the results 352 of processing to a circular buffer 332 formed in the shared memory 214. The circular buffer 332 may be implemented using one or more of the banks 216-222 of the shared memory 214. The depth of the circular buffer 332 is software configurable to accommodate the size and format of data transferred and transfer latency between the stream accelerator 204 and memory external to the VPAC 108. For example, configuration information provided to the stream accelerator 204 and the DMA controller 212 by the GPP 106 may set the depth of the circular buffer 332. Because the depth of the circular buffers formed in the shared memory 214 is adjustable, the VPAC 108 supports changes in buffer depth to accommodate instantaneous changes in external memory latency that can be identified only with application execution (i.e., execution of applications that access memory external to the VPAC 108 that is also accessed by the VPAC 108). The depth of the circular buffers in the VPAC 108 can be optimized by software configuration after the applications executing on the image processing system 100, and memory latency resulting from the execution, are characterized. The DMA controller 212 retrieves the processed image data 354 from the circular buffer 332 and transfers the processed image data 354 to a memory external to the VPAC 108, such as the on-chip RAM 116. In order to prevent stalls in the transfer of the real-time data output of the stream accelerator 204, the DMA controller 212, and specifically the channels of the DMA controller 212 assigned to transfer data from the circular buffer 332, may be configured to give priority to data transfer from the circular buffer 332 (relative to transfers of non-real-time data streams). Some implementations of the DMA controller 212 may apply a DMA engine that is dedicated to transfers of real-time data to transfer the processed image data 354 from the circular buffer 332 to memory external to the VPAC 108.

The stream accelerator 206 processes data retrieved from external memory by the DMA controller 212. The DMA controller 212 writes data 358 to be processed by the stream accelerator 206 in a circular buffer 334 formed in the shared memory 214. The circular buffer 334 may be implemented using one or more of the banks 216-222 of the shared memory 214. The depth of the circular buffer 334 is software configurable to accommodate the size and format of data transferred and transfer latency between external memory and the stream accelerator 206. For example, configuration information provided to the stream accelerator 206 and the DMA controller 212 by the GPP 106 may set the depth of the circular buffer 334.

The stream accelerator 206 retrieves data 356 to be processed from the circular buffer 334, processes the retrieved data 356, and transfers the results 360 of processing to a circular buffer 336 formed in the shared memory 214. The depth of the circular buffer 336 is software configurable to accommodate the size and format of data transferred and transfer latency between external memory and the stream accelerator 206. For example, configuration information provided to the stream accelerator 206 and the DMA controller 212 by the GPP 106 may set the depth of the circular buffer 336. The DMA controller 212 retrieves the processed data 362 from the circular buffer 336 and transfers the processed data 362 to a memory external to the VPAC 108, such as the on-chip RAM 116.

The memory-to-memory accelerator 208 processes data retrieved from external memory by the DMA controller 212. The DMA controller 212 writes data 366 to be processed by the memory-to-memory accelerator 208 in a circular buffer 338 formed in the shared memory 214. The circular buffer 338 may be implemented using one or more of the banks 216-222 of the shared memory 214. The depth of the circular buffer 338 is software configurable to accommodate the size and format of data transferred and transfer latency between external memory and the memory-to-memory accelerator 208. For example, configuration information provided to the memory-to-memory accelerator 208 and the DMA controller 212 by the GPP 106 may set the depth of the circular buffer 338.

The memory-to-memory accelerator 208 retrieves data 364 to be processed from the circular buffer 338, processes the retrieved data 364, and transfers the results 368 of processing to a circular buffer 350 formed in the shared memory 214. The depth of the circular buffer 350 is software configurable to accommodate the size and format of data transferred and transfer latency between external memory and the memory-to-memory accelerator 208. For example, configuration information provided to the memory-to-memory accelerator 208 and the DMA controller 212 by the GPP 106 may set the depth of the circular buffer 350. The DMA controller 212 retrieves the processed data 370 from the circular buffer 350 and transfers the processed data 372 to a memory external to the VPAC 108, such as the on-chip RAM 116.

FIGS. 3A and 3B illustrate only two configurations of the VPAC 108, and many additional configurations are possible. For example, the VPAC 108 may be configured to simultaneously provide transfer of processed data between some of the hardware accelerators through the shared memory 214, and processing by other hardware accelerators of data retrieved from external memory by the DMA controller 212.

Figure 4:
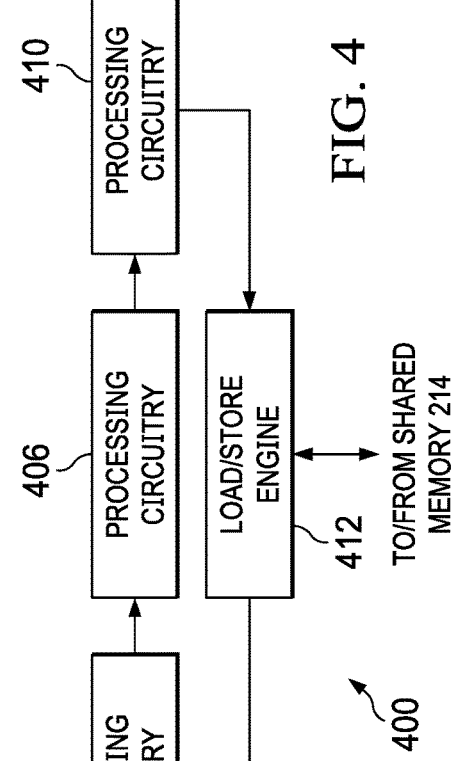
FIG. 4 shows a block diagram for an example of a stream processing accelerator in accordance with the present disclosure.

FIG. 4 shows a block diagram for an example of a stream processing accelerator 400 in accordance with the present disclosure. The stream processing accelerator 400 may be an implementation of the stream accelerator 204 and/or the stream accelerator 206. The stream processing accelerator 400 includes a processing circuitry 402, a processing circuitry 406, a processing circuitry 410, and a load/store engine 412. Various implementations of the stream processing accelerator 400 may include one or more processing circuit. The processing circuitry 402, the processing circuitry 406, and the processing circuitry 410 are arranged in series, such that the processing circuitry 406 processes the output of the processing circuitry 402 and the processing circuitry 410 processes the output of the processing circuitry 406. That is, the processing circuitry 406 is coupled to the output of the processing circuitry 402, and the processing circuitry 410 is coupled to the output of the processing circuitry 406.

The processing circuitry 402, the processing circuitry 406, and the processing circuitry 410 include circuitry to process a video stream in real-time (e.g., to process a line of video at a time). Data may be transferred between the processing circuitry 402, the processing circuitry 406, and the processing circuitry 410 in units of a pixel.

The load/store engine 412 controls transfer of image data between the shared memory 214 and the stream processing accelerator 400, and hides latency in accessing the shared memory 214 from the processing circuitry. For example, the load/store engine 412 retrieves image data from the shared memory 214 for processing by the stream processing accelerator 400, and the load/store engine 412 transfers data processed by the stream processing accelerator 400 to the shared memory 214 for storage. The load/store engine 412 controls access to the circular buffers formed in the shared memory 214. That is the load/store engine 412 is configured to set the parameters of the circular buffers such as start location, depth, access size, etc. Additional information about the load/store engine 412 is provided with regard to FIG. 6.

Some implementations of the stream processing accelerator 400 may apply the load/store engine 412 to implement transfer of data between two instances of the processing circuitry. For example, the load/store engine 412 may transfer output of the processing circuitry 402 to a circular buffer formed in the shared memory 214, and transfer data from the circular buffer as input to the processing circuitry 406.

Figure 5:
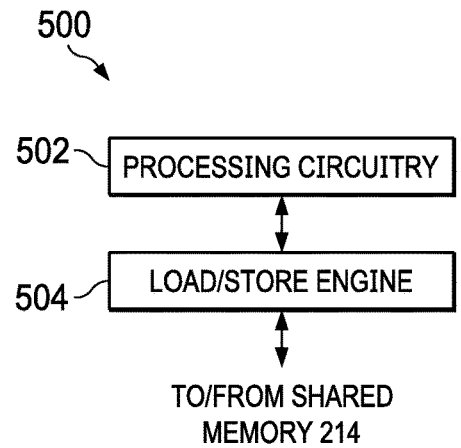
FIG. 5 shows a block diagram for an example of a block processing accelerator in accordance with the present disclosure.

FIG. 5 shows a block diagram for an example of a block processing accelerator 500 in accordance with the present disclosure. The block processing accelerator 500 includes processing circuitry 502 and a load/store engine 504. The processing circuitry 502 includes circuitry configured to apply one or more processing functions to a block of image data retrieved from the shared memory 214. For example, the processing circuitry 502 may be configured to apply lens distortion correction to blocks of image data retrieved from the shared memory 214.

The load/store engine 504 controls the transfer of image data between the shared memory 214 and the block processing accelerator 500, and hides latency in accessing the shared memory 214 from the processing circuitry 502. For example, the load/store engine 504 retrieves blocks of image data from the shared memory 214 for processing by the block processing accelerator 500, and the load/store engine 504 transfers blocks of data processed by the block processing accelerator 500 to the shared memory 214 for storage. A block of image data may include pixel data from multiple lines of an image. The load/store engine 504 controls access to the circular buffers formed in the shared memory 214. That is, the load/store engine 504 is configured to access a circular buffer based on software programmable parameters of the circular buffers such as start location, depth, access size, etc.

Some implementations of the processing accelerator 500 may process a single line, multiple lines, or small two-dimensional block formed from parts of multiple image lines.

Figure 6:
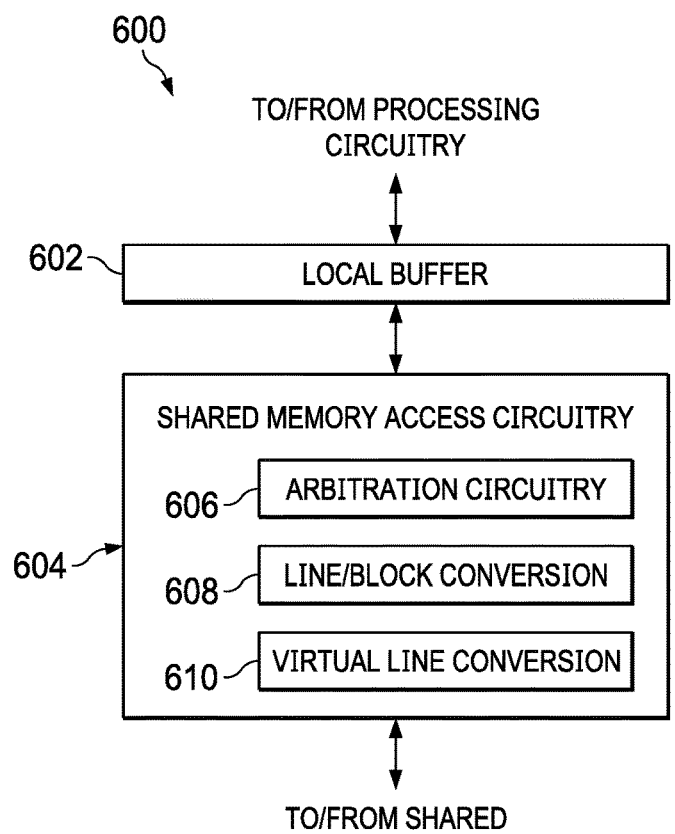
FIG. 6 shows a block diagram for an example of a load/store engine in accordance with the present disclosure.

FIG. 6 shows a block diagram for an example of a load/store engine 600 in accordance with the present disclosure. The load/store engine 600 is an implementation of the load/store engine 412 and/or the load/store engine 504. The load/store engine 600 is a circuit that transfers data between the shared memory 214 and a hardware accelerator. The load/store engine 600 includes a local buffer 602 and shared memory access circuitry 604. The local buffer 602 is a memory that temporarily stores data retrieved from the shared memory 214 for processing by the accelerator (e.g., stream processing accelerator 400 or the block processing accelerator 500) and temporarily stores data produced by the accelerator that is being transferred to the shared memory 214 for storage. The local buffer 602 allows the load/store engine 600 to insulate the processing circuitry (e.g., the processing circuitry 402, the processing circuitry 410, or the processing circuitry 502) of the accelerator from delays in accessing the shared memory 214, and to accumulate data sufficient to form a data unit for transfer to the shared memory 214. In some implementations, the load/store engine 600 may read and write to the shared memory 214 in 64 byte data units. For example, the load/store engine 600 may prefetch data from the shared memory 214 and store the prefetched data in the local buffer 602 so that the processing circuitry 402 sees no delays in accessing the data stored in the shared memory 214. Similarly, the data produced by the processing circuitry 410 is stored in the local buffer 602 so that the processing circuitry 410 sees no delays in transfer of the data to the shared memory 214.

The shared memory access circuitry 604 controls the transfer of data from the local buffer 602 to the shared memory 214, and from the shared memory 214 to the local buffer 602. The shared memory access circuitry 604 includes circuitry that generates read and write control signals for accessing the shared memory 214 and generates read and write control signals for accessing the local buffer 602. The shared memory access circuitry 604 include arbitration circuitry between read channels and write channels of the load/store engine 600. The shared memory access circuitry 604 may also include arbitration circuitry 606 that cooperates with other instances of the load/store engine 600 to obtain access to a bank of the shared memory 214. For example, the arbitration circuitry 606 may allow the shared memory access circuitry 604 to access a given bank of the shared memory 214 only if no other load/store engine 600 is currently accessing the given bank.

The shared memory access circuitry 604 may provide access to the shared memory 214 in units of data that are efficient for use by the processing circuitry (e.g., the processing circuitry 402, the processing circuitry 410, or the processing circuitry 502) of the accelerator. For example, while the shared memory access circuitry 604 accesses the shared memory 214 only in data units of predefined size, the shared memory access circuitry 604 may be configured to transfer specific data units that form lines of image data to/from the shared memory 214 for use by stream processing accelerator 400, and/or to transfer specific data units that form various size blocks of image data to/from the shared memory 214 for use by the block processing accelerator 500. The specific data units transferred may selected based on addressing parameters, such as offset and stride, which are programmed into the load/store engine 600. That is, the shared memory access circuitry 604 includes line/block conversion circuitry 608 that, in conjunction with the hardware thread scheduler 202, provides line-to-block and/or block-to-line conversion for an associated hardware accelerator, so that the processing circuitry of the hardware accelerator receives data for processing in the format that is most efficient for use by the processing circuitry. For example, if the processing circuitry 502 expects two-dimensional blocks of pixel data for processing, then the hardware thread scheduler 202 monitors the number of lines written to the shared memory 214, and notifies the load/store engine 600 when sufficient lines have been written to form a two-dimensional block. The line/block conversion circuitry 608 is pre-configured (e.g., software programmed) to, on receipt of the notification, read data from the shared memory 214 with addressing that retrieves the data to form the two-dimensional blocks needed by the processing circuitry of the hardware accelerator. The processing circuitry of the hardware accelerator is unaware of the conversion to block format provided by the load/store engine.

Similarly, if processing circuitry generates output in form of two-dimensional blocks, the load/store engine 600 (via the line/block conversion circuitry 608) may temporarily store a block of data, and transfer the block to the shared memory 214 with addressing that positions the block in the corresponding lines of data to optimize transfer efficiency.

The shared memory access circuitry 604 also includes virtual line conversion circuitry 610 that implements a "virtual line mode." The virtual line mode partitions a data stream into "lines" of any length to provide data to processing circuitry in units that promote efficient processing. For example, the shared memory access circuitry 604 may access the shared memory 214 to retrieve an entire row of pixel data from an image, or access the shared memory 214 to retrieve a specified number of bytes of pixel or other data (e.g., multiple lines) as best promotes efficient processing by processing circuitry coupled to the load/store engine 600. Similarly, output of processing circuitry that includes an arbitrary number of data units (bits, bytes, etc.) may be broken into lines by the virtual line conversion circuitry 610, where each line includes a predetermined number of data units, and written to the shared memory 214 as lines to optimize memory transfer efficiency.

While the processing accelerator 108 and the various features and advantages thereof have been described herein with respect to video and image processing, implementations of the processing accelerator 108 are applicable to a wide variety of data processing system that employ real-time and non-real-time processing of a data stream.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A processing accelerator, comprising:
   a shared memory;
   a stream accelerator coupled to the shared memory and configured to:
     process a real-time data stream; and
     store stream accelerator output data generated by processing the real-time data stream in the shared memory;
   a memory-to-memory accelerator coupled to the shared memory and configured to:
     retrieve input data from the shared memory;
     process the input data; and
     store, in the shared memory, memory-to-memory accelerator output data generated by processing the input data; and
   a common direct memory access (DMA) controller coupled to the shared memory and configured to:
     retrieve stream accelerator output data from the shared memory and transfer the stream accelerator output data to memory external to the processing accelerator; and
     retrieve the memory-to-memory accelerator output data from the shared memory and transfer the memory-to-memory accelerator output data to memory external to the processing accelerator.

2. The processing accelerator of claim 1, wherein:
   the stream accelerator is configured to access a first variable depth circular buffer formed in the shared memory to store the data generated by processing the real-time data stream; and
   the memory-to-memory accelerator is configured to access a second variable depth circular buffer formed in the shared memory to store the data generated by processing the input data.

3. The processing accelerator of claim 1, wherein the common DMA controller is configured to retrieve data from a circular buffer formed in the shared memory and transfer the retrieved data to a memory external to the processing accelerator, and a depth of the circular buffer is variable to access the memory external to the processing accelerator.

4. The processing accelerator of claim 1, wherein the stream accelerator and the memory-to-memory accelerator are hardware accelerators, and each of the hardware accelerators comprises a load/store engine configured to:
   hide latency in accessing the shared memory by buffering data retrieved from the shared memory and data to be transferred to the shared memory; and
   organize data retrieved from the shared memory as needed for processing by the hardware accelerator.

5. The processing accelerator of claim 4, wherein the load/store engine of the memory-to-memory accelerator is configured to organize lines of data written to the shared memory by the stream accelerator or loaded by the common DMA controller as two-dimensional blocks of data for processing by the memory-to-memory accelerator.

6. The processing accelerator of claim 4, wherein the load/store engine is configured to:
   receive data from one of the hardware accelerators, wherein the data is transferred to the load/store engine as a unit of a first length; and
   transfer the data to the shared memory as a virtual line having a second length that is different from the first length.

7. The processing accelerator of claim 1, wherein the common DMA controller comprises a plurality of channels, and one of the channels is configured to transfer a real-time data stream generated by the stream accelerator to memory external to the processing accelerator without software intervention during the transfer.

8. The processing accelerator of claim 1, wherein the shared memory comprises a plurality of banks, and the stream accelerator, the memory-to-memory accelerator and the common DMA controller are configured to write to and read from the banks of the shared memory to transfer data therebetween.

9. The processing accelerator of claim 1, wherein the stream accelerator is configured to:
   operate in a line mode wherein the stream processor completes processing of a first line of data before inputting a second line of data; and
   operate in a frame mode wherein the stream processor inputs the second line of data while processing the first line of data.

10. The processing accelerator of claim 1, further comprising a scheduler coupled to the stream accelerator and to the memory-to-memory accelerator, the scheduler configured to:
    synchronize retrieval of the input data from the shared memory by the memory-to-memory accelerator based on availability of the input data in the shared memory; and
    automatically initiate processing of a next frame by the stream accelerator on completion of processing of a current frame by the stream accelerator.

11. An image processing system, comprising:
a vision processing accelerator configured to process an image stream received from a camera, the vision processing accelerator comprising:
a shared memory comprising a plurality of banks;
a stream accelerator coupled to the shared memory and configured to:
process, in real-time, the image stream received from the camera; and
access a first variable depth circular buffer formed in the shared memory to store processed image data generated by the stream accelerator;
a memory-to-memory accelerator coupled to the shared memory and configured to:
process blocks of the processed image data generated by the stream accelerator;
access the first variable depth circular buffer to retrieve the processed image data; and
access a second variable depth circular buffer formed in the shared memory to store blocks of image data generated by the memory-to-memory accelerator;
a common direct memory access (DMA) controller coupled to the shared memory and configured to:
transfer image data generated by the stream accelerator to a memory external to the vision processing accelerator; and
transfer image data generated by the memory-to-memory accelerator to memory external to the vision processing accelerator; and
a scheduler coupled to the stream accelerator, the memory-to-memory accelerator, and the DMA controller, the scheduler configured to:
synchronize retrieval of the processed image data generated by the stream accelerator from the first variable depth circular buffer by the memory-to-memory accelerator based on availability of the processed image data in the first circular buffer; and
automatically initiate processing of a next frame by the stream accelerator on completion of processing of a current frame by the stream accelerator.

12. The image processing system of claim 11, wherein the common DMA controller is configured to transfer image data retrieved from a given circular buffer formed in the shared memory to a memory external to the vision processing accelerator, and a depth of the given circular buffer is variable to accommodate a time needed to access the memory external to the vision processing accelerator.

13. The image processing system of claim 11, wherein the stream accelerator and the memory-to-memory accelerator are hardware accelerators, and each of the hardware accelerators comprises a load/store engine configured to:
hide latency in accessing the shared memory by buffering data retrieved from the shared memory and data to be transferred to the shared memory; and
organize data retrieved from the shared memory as needed for processing by the hardware accelerator.

14. The image processing system of claim 13, wherein a load/store engine of the memory-to-memory accelerator is configured to organize lines of data written to the shared memory by the stream accelerator as two-dimensional blocks of data for processing by the memory-to-memory accelerator.

15. The image processing system of claim 13, wherein the load/store engine is configured to:
receive data from one of the hardware accelerators, wherein the data is transferred to the load/store engine as a unit of a first length; and
transfer the data to the shared memory as a virtual line having a second length that is different from the first length.

16. The image processing system of claim 11, wherein the stream accelerator is configured to:
operate in a line mode wherein the stream processor completes processing of a first line of data before inputting a second line of data; and
operate in a frame mode wherein the stream processor inputs the second line of data while processing the first line of data.

17. An image processing accelerator, comprising:
a shared memory;
a plurality of hardware accelerators, each of the hardware accelerators coupled to the shared memory, and configured to:
transfer image data via circular buffers formed in the shared memory;
process the image data to produce processed image data; and
store the processed image data in one of the circular buffers;
a common direct memory access (DMA) controller coupled to the shared memory, and configured to transfer data between memory external to the image processing accelerator and one or more of the circular buffers; and
a scheduler coupled to the common DMA controller and each of the hardware accelerators, wherein the scheduler is configured to:
monitor transfer of data to the circular buffers by the hardware accelerators and the common DMA controller; and
synchronize retrieval of data from the circular buffers by the hardware accelerators and the common DMA controller based on availability of data in the circular buffers.

18. The image processing accelerator of claim 17, wherein one or more of the hardware accelerators is configured to receive the image data directly from a camera.

19. The image processing accelerator of claim 17, wherein one or more of the hardware accelerators is configured to retrieve the image data from one of the circular buffers.

20. The image processing accelerator of claim 17, wherein a depth of each of the circular buffers is variable.

21. The image processing accelerator of claim 17, wherein each of the hardware accelerators comprises a load/store engine configured to:
organize data retrieved from one of the circular buffers as a two-dimensional block of data for processing by the hardware accelerator;
receive data from the hardware accelerator, wherein the data is transferred to the load/store engine as a unit of a first length; and
transfer the data to the shared memory as a virtual line having a second length that is different from the first length.

22. The image processing accelerator of claim 17, wherein the scheduler is configured to automatically initiate processing of a next frame by one of the hardware accelerators on completion of processing of a current frame by the one of the hardware accelerators.

23. The image processing accelerator of claim 17, wherein the common DMA controller comprises a plurality of channels, and each of the channels is configured to transfer image data between the memory external to the image processing accelerator and a different one of the circular buffers.

* * * * *